US011422268B1

(12) United States Patent
Gill et al.

(10) Patent No.: US 11,422,268 B1
(45) Date of Patent: Aug. 23, 2022

(54) LONG DISTANCE SPACE FLIGHT LASER RANGE FINDER

(71) Applicant: United States of America as represented by the Administrator of NASA, Washington, DC (US)

(72) Inventors: Nathaniel A. Gill, Ellicott City, MD (US); Kenneth J. McCaughey, Greenbelt, MD (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 753 days.

(21) Appl. No.: 16/143,804

(22) Filed: Sep. 27, 2018

(51) Int. Cl.
*G01S 17/933* (2020.01)
*G01S 7/484* (2006.01)
*G01S 7/4861* (2020.01)

(52) U.S. Cl.
CPC ............ *G01S 17/933* (2013.01); *G01S 7/484* (2013.01); *G01S 7/4861* (2013.01)

(58) Field of Classification Search
CPC ....... G01S 7/484; G01S 7/4861; G01S 17/933
See application file for complete search history.

(56) References Cited

U.S. PATENT DOCUMENTS

| 8,081,301 B2 * | 12/2011 | Stann | G01C 3/08 |
| | | | 356/5.09 |
| 8,925,814 B1 * | 1/2015 | Schneider | G06K 7/10851 |
| | | | 235/438 |
| 10,003,168 B1 * | 6/2018 | Villeneuve | G02B 27/10 |
| 2008/0068585 A1 * | 3/2008 | Yoshino | G01S 7/487 |
| | | | 356/5.01 |
| 2015/0177383 A1 * | 6/2015 | Ruff | G01S 17/89 |
| | | | 356/4.01 |
| 2018/0284240 A1 * | 10/2018 | LaChapelle | G01S 17/42 |
| 2021/0075447 A1 * | 3/2021 | Cook | H03F 3/19 |

* cited by examiner

*Primary Examiner* — Luke D Ratcliffe
(74) *Attorney, Agent, or Firm* — Matthew F. Johnston; Bryan A. Geurts; Helen M. Galus (57) ABSTRACT

A laser range finder system to determine the range of a target including a laser pulse generating device and a laser amplifier for amplifying laser pulses to produce amplified laser pulses. Amplified laser pulses are transmitted toward a target and a laser pulse echoes reflected by a target are received by a receiver. The receiver includes a laser light detector and dual signal conditioning channels to condition and amplify signals derived from detected laser light and output conditioned signals. A high-gain channel amplifies laser pulse echoes having relatively lower signal power and a low-gain channel amplifies laser pulse echoes having relatively higher signal power. A digitizer produce samples of laser pulses and converts the samples to digital signals. A processing element processes the digital signals to determine an echo signature, a time of flight to the target and a range to the target.

13 Claims, 8 Drawing Sheets

LONG DISTANCE SPACE FLIGHT LASER RANGE FINDER

ORIGIN OF INVENTION

The invention described herein was made by an employee of the United States Government, and may be manufactured and used by or for the Government for governmental purposes without the payment of any royalties thereon or therefor.

CROSS REFERENCE TO OTHER PATENT APPLICATIONS

None.

FIELD OF THE INVENTION

The present invention relates to a long range laser range finder.

BACKGROUND

Low Earth Orbit (LEO) satellites require periodic servicing and restoration. Typically, special spacecraft are launched into the same orbit in order to autonomously rendezvous with and robotically service the LEO. The spacecraft typically carries a payload which has robotic arms for grasping the LEO satellite and performing repairs or maintenance on the satellite. The payload includes camera systems, video data handling and processing electronics and data signal processing and storage electronics. The payload further includes a LIDAR (Light Detection and Ranging) system. The docking of the servicing spacecraft with the LEO satellite is a difficult and delicate procedure with virtually no room for error. If the service spacecraft's velocity is too great, the spacecraft could damage the satellite upon making physical contact. Therefore, it is very important that the servicing spacecraft know the precise range to the LEO satellite so that the flight time to the satellite and the required spacecraft velocity can be determined.

Therefore, what is needed is a highly accurate long distance laser range finder system that can determine the precise range to the satellite and which can work in conjunction with a LIDAR system.

SUMMARY OF THE INVENTION

The present invention is directed to a low cost, modular, highly accurate and efficient long distance laser range finder (LRF) system that precisely determines the range to a target (e.g. LEO satellite). The laser range finder system includes a main electronics module and a front end module. The main electronics module includes a plurality of cards, each of which performing a specific function. Specifically, the main electronics module includes a front end module interface card, a fiber laser card, a processor card and a power supply card. In an exemplary embodiment, the front-end module interface card, fiber laser card, processor card and power supply card are all electrically connected to a backplane that is located in the main electronics module. The backplane provides the appropriate power supply voltages to each of the cards and also provides at least one data signal bus by which the cards communicate with each other. Upon receiving a command, the fiber laser card generates laser pulses. Fiber laser card includes electronic circuitry that can cause the power of the laser pulses to be varied over a predetermined dynamic range. In an exemplary embodiment, the predetermined dynamic range is about 10 dB. The laser pulses generated by the fiber laser card are routed to the front end module. The front-end module comprises laser transmitting components including a collimator. The laser pulses are transmitted in the direction of the target (e.g. satellite). The laser pulses bounce off of the target and return to the front-end module as laser pulse echoes. The front end module comprises a receiver that includes laser pulse detection components and signal conditioning circuitry. The detected laser pulses are converted into an electrical signal which is then conditioned by the signal conditioning circuitry. The signal conditioning circuitry includes dual amplification channels that include a high-gain channel and a low-gain channel. The signal conditioning circuitry includes variable gain electronics controlled by an automatic gain control signal. The variable gain electronics in conjunction with the high-gain channel and low-gain channel provide a wide dynamic range of at least 70 dB. The conditioned signals that are outputted by the signal conditioning circuitry are routed to the processing card wherein the conditioned signals are digitized and processed with processing elements programmed with signal processing algorithms in order to determine an echo signature, the time of flight to the target and the range to the target. The capability of varying the power of the transmitted laser pulses in conjunction with the wide dynamic range of the receiver allows range measurements to be obtained from multiple kilometers down to a meter or less. The back end processing of the detected laser pulse echoes allows for longer range capability, resilience to interference and low range noise. Thus, the long distance LRF system of the present invention obtains precise range measurements for short and long range targets with faster acquisition rates but yet with relatively lower mass volume and power consumption.

Thus, in one aspect, the present invention is directed to a laser range finder system for determining the range of a target, comprising a laser pulse generating device for generating laser pulses, and a laser amplifier for amplifying the laser pulses to produce amplified laser pulses. The laser amplifier includes laser components that can vary the power of the amplified laser pulses. The laser range finder system further comprises a transmitter for transmitting the amplified laser pulses toward a target and a receiver for receiving laser pulse echoes reflected by a target. The receiver includes a laser light detector and dual signal conditioning channels to condition and amplify signals derived from detected laser light and output conditioned signals. One of the channels is a high-gain channel for amplifying laser pulse echoes having relatively lower signal power and the other channel is a low-gain channel for amplifying laser pulse echoes having relatively higher signal power. The laser range finder system further comprises a digitizer to sample the conditioned signals outputted by the dual signal conditioning channels so as to produce samples of laser pulses and convert the samples to digital signals, and a processing element to process the digital signals to determine an echo signature, a time of flight to the target and a range to the target.

In one embodiment, the aforementioned processing element is realized by a field programmable gate array (FPGA). In such an embodiment, digitizing the conditioned signals outputted by the dual signal conditioning channels and processing the digitized conditioned signals with the FPGA improves signal-to-noise ratio by over 25 dB. Such an improvement in signal-to-noise ratio significantly increases operation range without requiring increased laser power or larger receiver optics.

Certain features and advantages of the present invention have been generally described in this summary section. However, additional features, advantages and embodiments are presented herein or will be apparent to one of ordinary skill of the art in view of the drawings, specification and claims hereof. Accordingly, it should be understood that the scope of the invention shall not be limited by the particular embodiments disclosed in this summary section.

DETAILED DESCRIPTION OF EXEMPLARY EMBODIMENTS

As used herein, the term "spacecraft" refers to any type of spacecraft used in space or space applications and includes satellites, CubeSats, space stations, capsules, modules, rockets, probes, pods, planetary rovers and other space exploration vehicles.

As used herein, the terms "comprises", "comprising", "includes", "including", "has", "having" or any other variation thereof, are intended to cover a non-exclusive inclusion. For example, a process, method, article or apparatus that comprises a list of elements is not necessarily limited to only those elements, but may include other elements not expressly listed or inherent to such process, method, article or apparatus.

It is to be understood that throughout this description, terms such as "vertical", "horizontal", "top", "bottom", "upper", "lower", "middle", "above", "below" and the like are used for convenience in identifying relative locations of various components and surfaces relative to one another in reference to the drawings and that the apparatus be installed and used in substantially any orientation so that these terms are not intended to be limiting in any way.

Approximating language, as used herein throughout the specification and claims, may be applied to modify any quantitative representation that could permissibly vary without resulting in a change in the basic function to which it is related. Accordingly, a value modified by a term such as "about" or "approximately" is not limited to the precise value specified.

As used herein, the term "memory medium" includes any of various types of memory devices or storage devices, such an installation medium, e.g., a CD-ROM, floppy disks, or tape device; a computer system memory or random access memory such as DRAM, DDR RAM, SRAM, SDRAM, EDO RAM, Rambus RAM, etc.; a non-volatile memory such as a Flash, magnetic media, e.g., a hard drive, or optical storage; registers or other similar types of memory elements, etc. The memory medium may include other types of memory as well or combinations thereof. In addition, the memory medium may be located in a first computer system in which the programs are executed, or may be located in a second different computer system which connects to the first computer system over a network, such as the Internet. In the latter scenario, the second computer system may provide program instructions to the first computer for execution. The term "memory medium" may include two or more memory mediums which may reside in different locations, e.g. in different computer systems that are connected over a network. The memory medium may store program instructions (e.g., embodied as computer programs) that may be executed by one or more processors.

As used herein, "Programmable Hardware Element" includes various hardware devices comprising multiple programmable function blocks connected via a programmable interconnect. Examples include Arduino boards, programmable control circuits or boards, FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look-up tables) to coarse grained (arithmetic logic units or processor cores). Other examples of "Programmable Hardware Elements" include programmable power supplies, programmable voltage sources and programmable voltage controlled oscillators (VCXO).

As used herein, "Processing Element" refers to various elements or combinations of elements. Processing elements include, for example, circuits such as an ASIC (Application Specific Integrated Circuit), portions or circuits of individual processor cores, entire processor cores, individual processors, signal processors having analog-to-digital conversion circuitry, programmable hardware devices such as field programmable gate array (FPGA), and or larger portions of systems that include multiple processors.

As used herein, "Computer" or "Computer System" refers to any of various types of computing or processing systems, including a personal computer system (PC), mainframe computer system, workstation, network appliance, Internet appliance, personal digital assistant (PDA), personal communication device, smart phone, television system, grid computing system, or other device or combinations of devices, or any device (or combination of devices) having at least one "processing element" that executes instructions from a memory medium.

Figure 1:
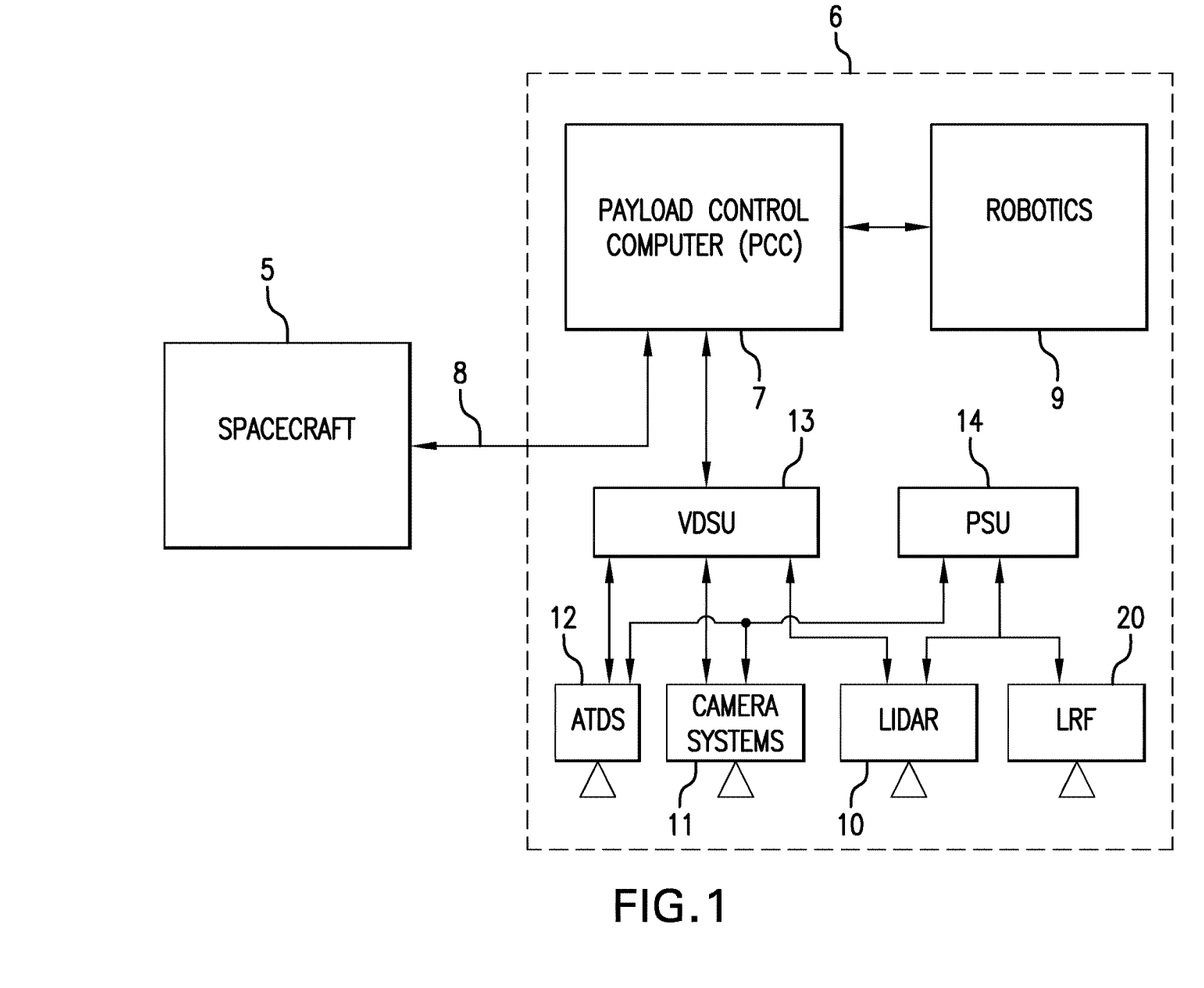
FIG. 1 is a general block diagram of a spacecraft and payload for servicing a satellite in orbit, wherein the payload employs the laser range finder (LRF) system of the present invention.

Referring to FIG. 1, there is shown a block diagram showing spacecraft 5 and corresponding servicing payload 6 that uses laser range finder (LRF) 20 of the present invention. Servicing payload 6 includes payload control computer (PCC) 7. Bus 8 establishes electronic signal communication between PCC 7 and a computer system (not shown) on spacecraft 5. Servicing payload 6 includes robotics system 9 which is in electronic signal communication with PCC 7. Robotics system 9 includes robotic arms and robotically controlled devices for grasping and retaining the LEO satellite and performing maintenance operations. Payload 6 includes LIDAR (Light Detection and Ranging) system 10, camera system 11 and ATDS system 12 which are all in electronic data with Video Distribution and Storage Unit (VDSU) 13. Payload 6 includes Power Supply Unit (PSU) 14 which provides power to LIDAR system 10, camera system 11, ATDS system 12 and LRF 20. Camera system 11 includes various cameras such as a narrow field of view visible camera, a wide field of view visible camera and wide field of view, long-wave infra-red camera, all of which not being shown in the diagram but are well known in the art. PSU 14 is also configured to provide a serial interface between PCC 7 and LIDAR system 10 and between PCC 7 and LRF 20. LIDAR system 10 is also in electronic signal communication with LRF 20.

Figure 2:
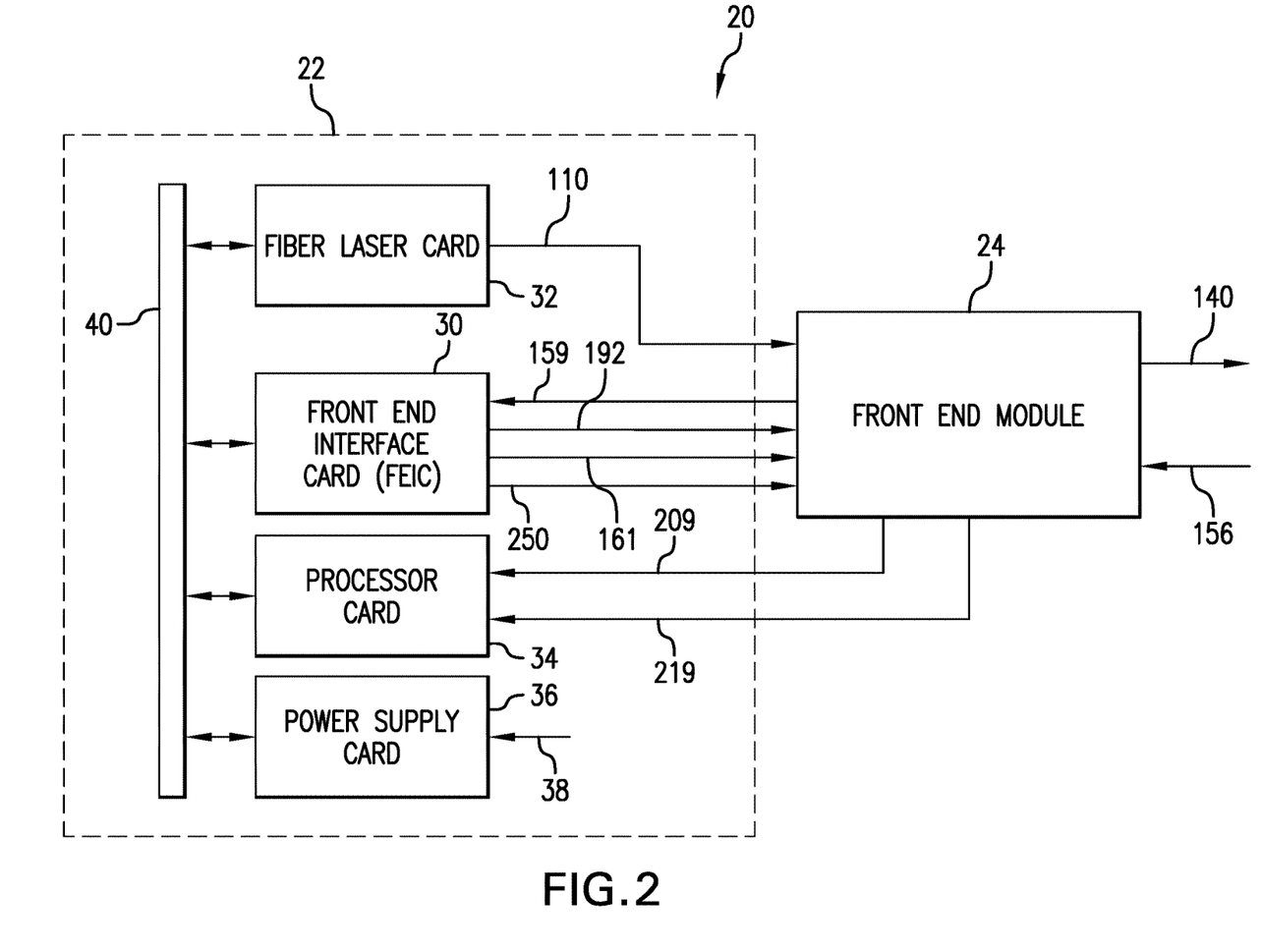
FIG. 2 is a block diagram of the LRF system in accordance with an exemplary embodiment of the present invention.

Referring to FIG. 2, there is shown a block diagram of LRF 20 in accordance with an exemplary embodiment of the invention. As will be apparent from the ensuing description, LRF 20 is a low cost, modular, long distance laser range finder system that accurately and precisely determines the range to a target such as a satellite. However, it is to be understood that LRF 20 may be used in many applications other than space.

LRF 20 includes main electronics module 22 and front end module 24. Main electronics module 22 includes a plurality of sub-modules, referred to herein as "cards". Each card performs a specific function. Specifically, main electronics module 22 includes front end interface card (FEIC) 30, fiber laser card 32, processing card 34 and power supply card 36. Power supply card 36 includes voltage regulation circuitry, current limiting circuitry, EMI filter circuitry, inhibiting circuitry, power failure warning circuitry and current draw indicator circuitry which are all known in the art and are therefore not described in detail. Power supply card 36 also includes power-on reset circuitry. Power supply card 36 includes primary voltage 38 from PSU 14 (see FIG. 1) and converts this primary voltage 38 into different DC voltages at specified currents for use by FEIC 30, fiber laser card 32 and processing card 34. Main electronics module 22 includes backplane 40 that is electrically connected to power supply card 36. All of the cards are electrically connected to backplane 40. Backplane 40 distributes the appropriate power supply voltage to each of the cards. Electronic data signals are also transferred between cards via backplane 40. In an exemplary embodiment, primary voltage 38 is 28 VDC and the output voltages provided to power supply backplane 40 are +/−12 VDC, +5 VDC and +3.3 VDC.

Fiber laser card 32 includes a fiber laser source that produces laser pulses. As will be described in detail in the ensuing description, fiber laser card 32 includes electronic circuitry that receives various command and control signals from processor card 34 including a rising-edge pulse trigger signal which causes generation of the laser pulses. The command and control signals define the power level of the generated laser pulses. The electronic circuitry and fiber optic network of fiber laser card 32 are configured so that command and control signals from processor card 34 can vary the power level of the generated laser pulses over a predetermined dynamic range. In an exemplary embodiment, the predetermined dynamic range is about 10 dB. The electronic circuitry of fiber laser card 32 also outputs various digitized telemetry signals that indicate temperatures, current readings, and circuit board voltages. Fiber laser card 32 further includes a fiber laser amplifier that amplifies the laser pulses. The amplified laser pulses 110 are coupled to front end module 24. Front-end module 24 comprises a transmitter to transmit laser pulses 140 in the direction of a target (e.g. LEO satellite). Laser pulses bounce off of the target and return to front-end module 24 as laser pulse echoes 156. In an exemplary embodiment, the fiber laser card 32 outputs laser pulses 110 having a center wavelength of about 1553 nm, a peak pulse energy of about 2 uJ, a pulse width between about 2.0 ns and 3.0 ns, a minimum repetition rate of about 5 kHz and a maximum repetition rate of about 40 kHz.

As will be described in detail in the ensuing description, front end module 24 includes a receiver that receives and processes laser pulse echoes 156. Specifically, the receiver comprises laser light detector circuit 150 (see FIG. 5) that includes laser light capturing device 154 which captures or collects laser pulse echoes 156. The receiver includes signal conditioning circuitry 151 (see FIG. 5) that filters and amplifies the detected pulsed laser echoes. Signal conditioning circuitry 151 includes dual amplification channels that include a high-gain channel and a low-gain channel. Signal conditioning circuitry 151 includes a variable gain device controlled by an automatic gain control signal. The automatic gain control signal is generated in processor card 34 and routed to the receiver via FEIC 30. The variable gain function in conjunction with the high-gain channel and low-gain channel provide a wide dynamic range of at least 70 dB. Signal conditioning circuitry 151 outputs amplified and conditioned signals 209 and 219 which are routed to processing card 34 via cables, wires or twisted pairs (not shown). Processing card 34 includes processing elements that process signals 209 and 219 with signal processing algorithms in order to determine an echo signature, the time of flight to the target and the range to the target.

The capability to vary the power of the laser pulses outputted by fiber laser card 32 coupled with the wide dynamic range of the receiver in front end module 24 allows range measurements to be obtained from multiple kilometers down to a meter or less. The back end processing of the detected laser pulse echoes by processing card 34 allows for longer range capability, resilience to interference and low range noise. Main electronics module 22 is discussed in detail in the ensuing description.

Figure 3:
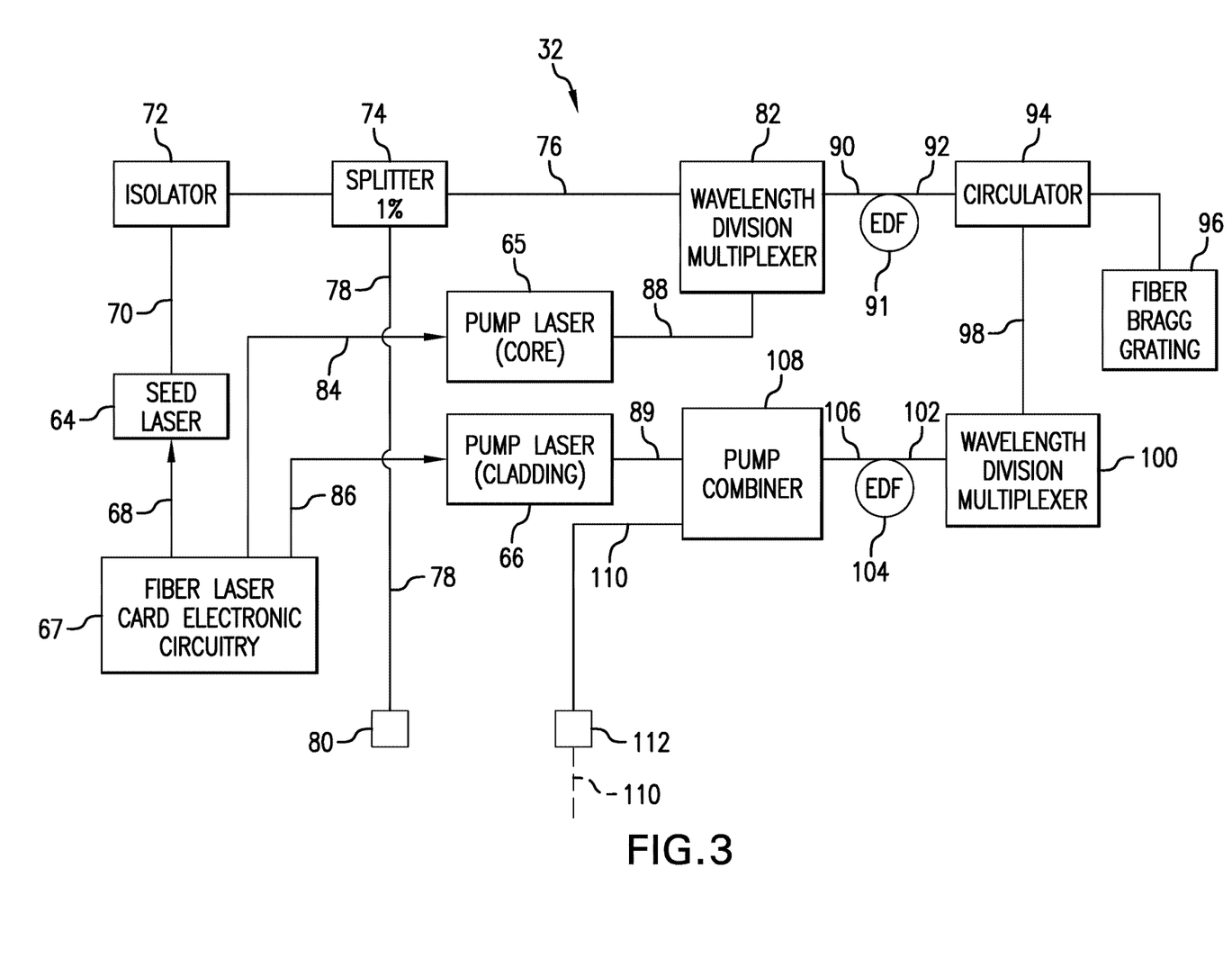
FIG. 3 is a block diagram of a fiber laser card of the LRF system.

Referring to FIG. 3, there is shown a block diagram of fiber laser card 32. Fiber laser card 32 is a fiber laser system having a cladding-pumped design that includes a single seed laser 64 and pump lasers 65 and 66. In an exemplary embodiment, single seed laser 64 comprises a photodiode and a Thermal Electric Cooler (TEC). In an exemplary embodiment, each pump laser 65 and 66 also comprises a photodiode and Thermal Electric Cooler (TEC). Fiber laser card 32 further includes fiber laser card electronic circuitry 67 which is in electronic signal communication with processing card 34. As will be described in detail in the ensuing description, processing card 34 provides numerous command and control signals to electronic circuitry 67 and in response, electronic circuitry 67 initiates the generation of laser pulses and provides numerous status signals to processing card 34. Electronic circuitry 67 comprises different types of electronic circuits that will be discussed in the ensuing description. Upon receiving a command signal from processing card 34, electronic circuitry 67 generates current pulse waveform 68 that is coupled to seed laser 64. In response, seed laser 64 outputs laser pulses 70. After passing through isolator 72, laser pulses 70 are coupled to one-percent splitter 74. Splitter 74 outputs laser pulses 76 having power that is ninety-nine percent of the power of laser pulses 70. Splitter 74 also outputs laser pulses 78 which have one percent of the power of laser pulses 70. Laser pulses 78 are coupled signal connector 80 via a fiber optic cable. Laser pulses 78 are used for feedback and calibration purposes.

Referring again to FIG. 3, laser pulses 76 are coupled to wavelength division multiplexer 82. In this particular embodiment, wavelength division multiplexer 82 functions as a color filter that combines different wavelengths. Electronic circuitry 67 also outputs current waveforms 84 and 86 that are coupled to core pump laser 65 and cladding pump laser 66, respectively. Core pump laser 65 outputs laser pulses 88 that are coupled to wavelength division multiplexer 82. Cladding pump laser 66 outputs laser pulses 89 which are coupled to pump combiner 108. Wavelength division multiplexer 82 outputs laser pulses 90 which are amplified by a section of Erbium Doped Fiber (EDF) 91 which has a predetermined length. In an exemplary embodiment, EDF 91 has a length of about 9 m. The amplified laser pulses 92 are coupled to circulator 94 and filtered by Fiber Bragg Grating 96. In this embodiment, Fiber Bragg Grating 96 is configured as a band pass filter. Circulator 94 outputs filtered laser pulses 98 that are coupled to wavelength division multiplexer 100. Wavelength division multiplexer 100 outputs laser pulses 102 that are amplified by another section of Erbium Doped Fiber (EDF) 104. EDF 104 produces amplified laser pulses 106 that are coupled to pump combiner 108. Pump combiner 108 combines the laser pulses 89 from pump laser 66 with laser pulses 106 to produce laser pulses 110 which are coupled to output port 112. Laser pulses 110 are the main laser pulses and are coupled to front end module 24 via a fiber optic cable (see FIG. 2).

Figure 4:
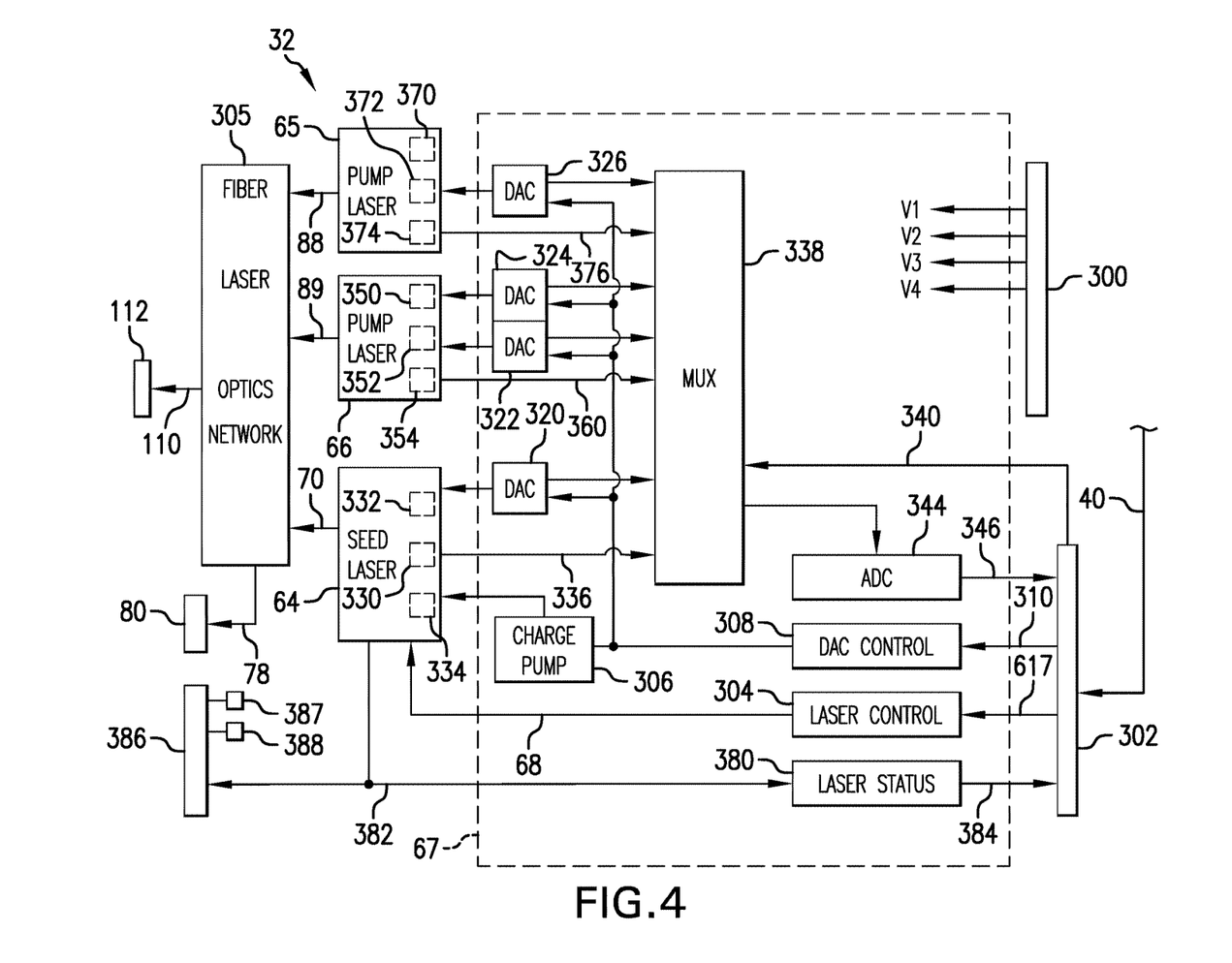
FIG. 4 is a schematic diagram of the fiber laser card.

Referring to FIG. 4, there is shown a schematic diagram of fiber laser card 32. Fiber laser card electronic circuitry 67 comprises a plurality of electronic components and fiber laser optics network 305 represents all of the optical components shown in FIG. 3 except seed laser 64 and pump lasers 65 and 66. The specific electronic components of fiber laser card electronic circuitry 67 will be discussed in detail in the ensuing description. However, in order to facilitate understanding of the invention, front end module 24 shown in FIG. 5 will be described prior to describing fiber laser card electronic circuitry 67 shown in FIG. 4.

Figure 5:
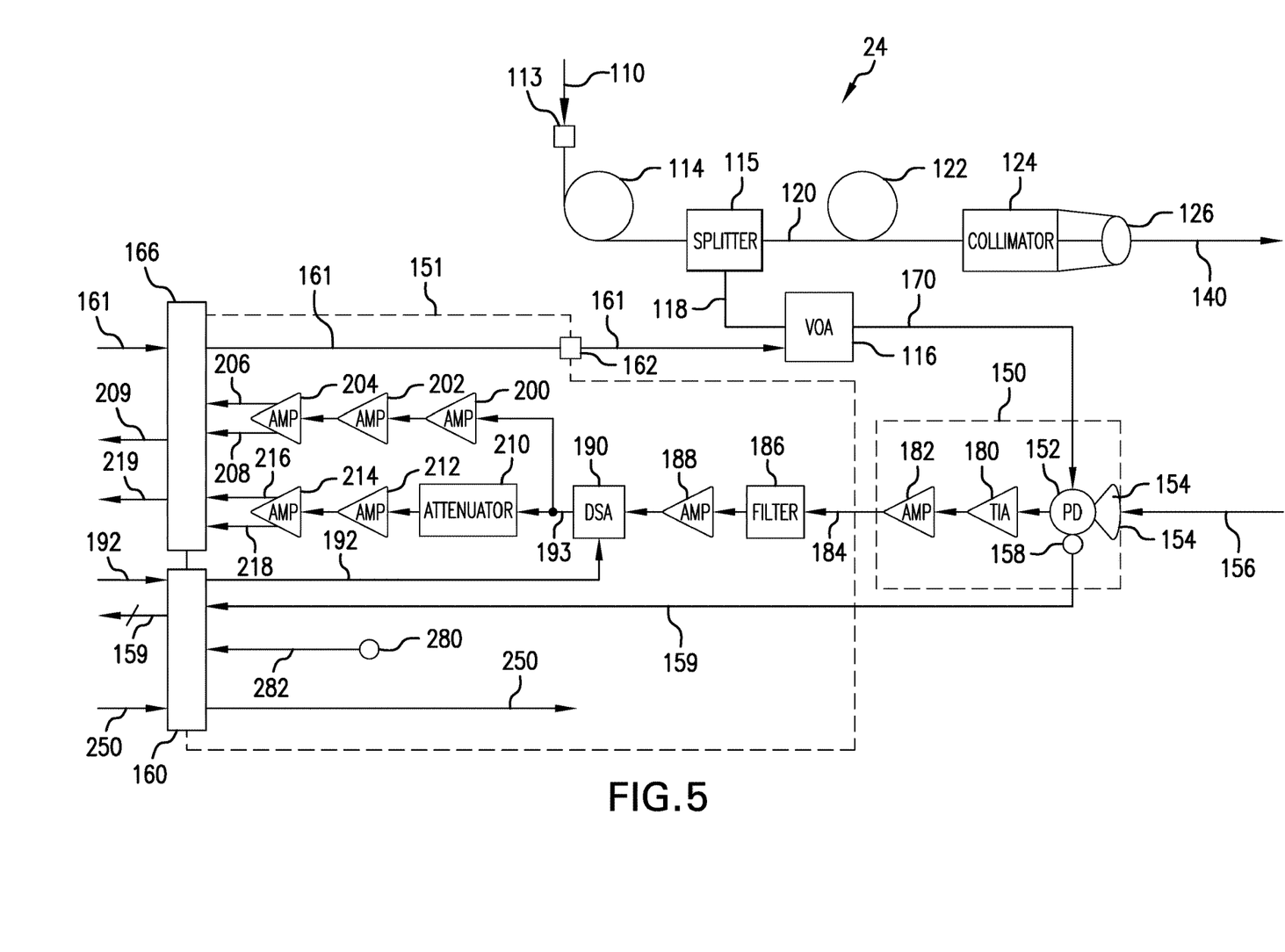
FIG. 5 is a schematic diagram of a front end module of the LRF system, the schematic diagram showing a laser pulse transmitter and a receiver for detecting and conditioning laser pulse echoes.

Referring to FIG. 5, front end module 24 includes a laser transmitter that is optically coupled to input port 113. In an exemplary embodiment, the laser transmitter includes slack loop 114 and one-percent splitter 115. Main laser pulses 110 are fed to slack loop 114 and then coupled to one-percent splitter 115. The laser transmitter further includes variable optical attenuator (VOA) 116. Splitter 115 outputs laser pulses 118 which are one-percent of main laser pulses 110. Laser pulses 118 are coupled to VOA 116. Splitter 115 also outputs laser pulses 120 which are ninety-nine percent of main laser pulses 110. The laser transmitter further includes delay loop 122 and collimator 124. Laser pulses 120 travel through delay loop 122 and then through collimator 124. Collimator 124 includes a lens, mirror or combination of both, indicated by reference number 126. The transmitted laser pulses 140 are directed to the target. The actually delay of delay loop 122 may be varied and depends upon the tolerances of the other components in the laser transmitter, such as splitter 115 and VOA 116.

Referring to FIG. 5, front end module 24 further includes a receiver which comprises laser energy detector device 150 and signal conditioning circuitry 151. In an exemplary embodiment, laser energy detector device 150 includes at least one photodiode (PD) 152 and optical energy capturing device 154. In an exemplary embodiment, photodiode 152 is a large area, InGaAs PIN Photodiode. Optical energy capturing device 154 can be a lens or mirror or combination of both. In one embodiment, optical energy collecting device 154 is a Winston Cone. Optical energy capturing device 154 captures laser pulse echoes 156 returning from the target. Laser energy detector device 150 includes thermistor circuit 158. Thermistor circuit 158 outputs analog telemetry signals over wire 159 which is electrically connected to electrical connector 160. Analog telemetry signals 159 are routed to FEIC 30 which digitizes these signals and then transfers the signals to processor card 34 via backplane 40. Processor card 34 then processes the digitized version of the telemetry signals to determine the temperature of photodiode 152. All analog telemetry signals outputted by the receiver are indicated by reference number 159.

Figure 6:
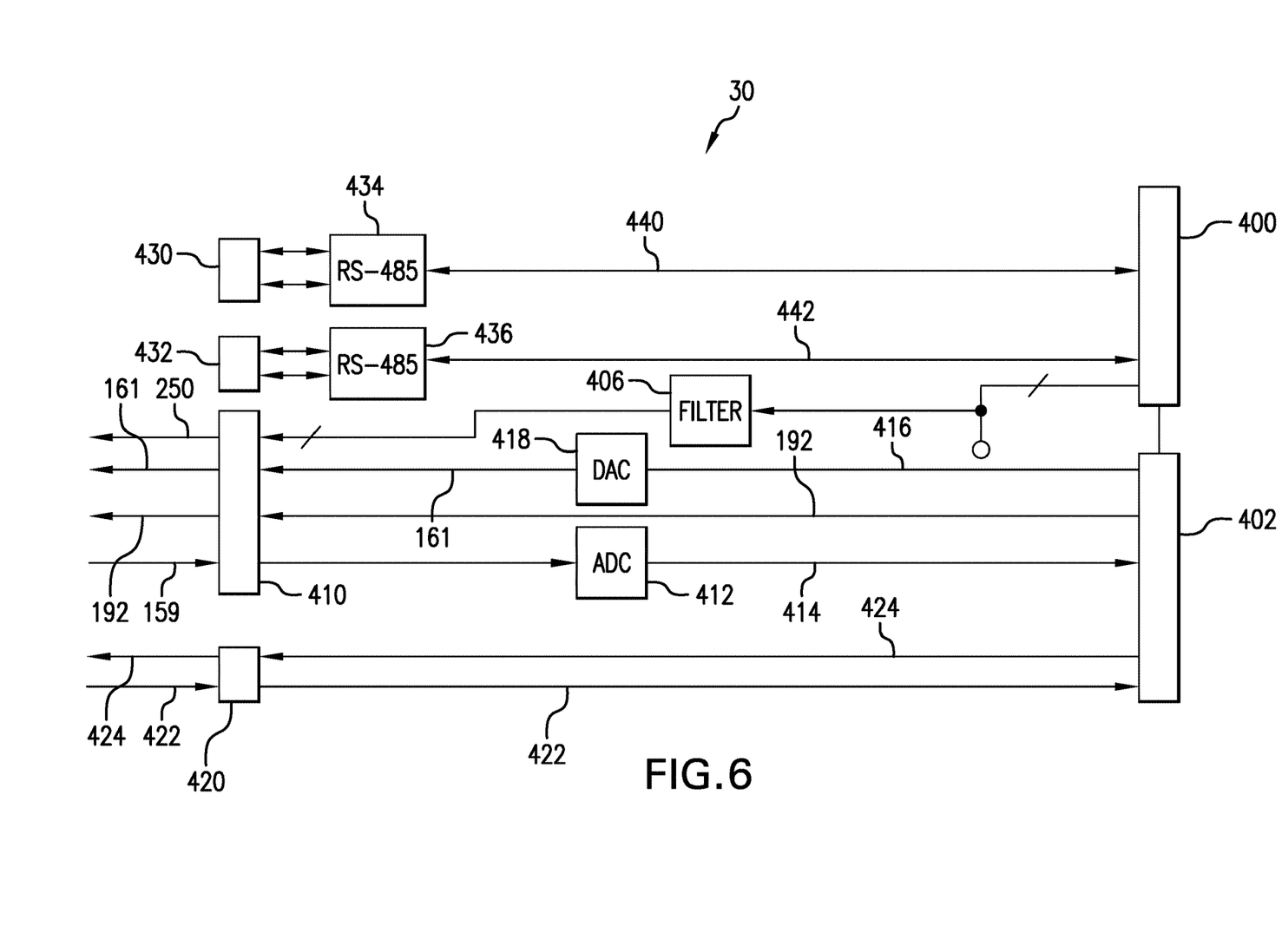
FIG. 6 is a block diagram of a front end interface card of the LRF system.

Referring to FIG. 6, front end module interface card 30 provides variable DC voltage signal 161 to connector 166. Electrical connector 166 is electrically connected to terminal 162. Terminal 162 is electrically connected to the input of variable optical attenuator (VOA) 116. The magnitude of DC voltage signal 161 determines the level of attenuation that is to be exhibited by VOA 116. Therefore, the power level of laser pulses 170 is determined by the magnitude of DC voltage 161. The magnitude of DC voltage 161 is determined by processor card 34. Pulsed laser energy 170 is coupled into laser energy detector circuit 150 and is detected by photodiode 152. Therefore, laser pulse echoes 156 as well as laser pulses 170 are detected by photodiode 152. In response, photodiode 152 outputs pulses of electrical current that corresponds to the pulses of laser pulse echoes 156. The electrical current is coupled to transimpedance amplifier (TIA) 180 which converts the electrical current pulses to voltage pulses. The voltage pulses are coupled to amplifier 182 which amplifies the voltage pulses and outputs amplified voltage pulses 184. Amplified voltage pulses 184 are coupled to signal conditioning circuit 151 wherein voltage pulses 184 are filtered by filter 186. In one embodiment, filter 186 is a low-pass filter. In an exemplary embodiment, the low pass filter has a bandwidth of about 300 MHz. Filter 186 outputs a filtered voltage pulse waveform that is amplified by amplifier 188. The output of amplifier 188 is coupled to the input of digital step attenuator (DSA) 190. DSA 190 has an input for receiving a multi-bit digital signal 192 that defines a desired level of attenuation that is to be exhibited by DSA 190. Hence, digital signal 192 functions as a gain-control signal that controls the attenuation of DSA 190 in discrete steps over a dynamic range so that the gain of output signal 193 can be varied over a dynamic range. Processor card 34 generates digital signal 192 as a result of information processor card 34 receives from Payload Control Computer System 7 (see FIG. 1). Digital signal 192 is routed to electrical connector 160 of FEM 24 via FEIC 30.

Referring to FIG. 5, signal conditioning circuitry 151 includes a high-gain channel and a low-gain channel. The high-gain channel includes amplifiers 200, 202 and 204 that are arranged in cascade. Amplifiers 200, 202 and 204 provide significant gain to a weak or low-level voltage pulse signal 193. Amplifier 204 has differential outputs 206 and 208 that are coupled to electrical connector 166. The signals provide by differential outputs 206 and 208 are routed to processor card 34 and are indicated by reference number 209. As will be explained in the ensuing description, processor card 34 processes signals 209 to determine time of flight and range to the target. The low-gain channel of signal conditioning circuitry 151 includes attenuator 210 and amplifiers 212 and 214. Amplifier 214 has differential outputs 216 and 218 that are coupled to electrical connector 166. Differential outputs 216 and 218 provide signals 219 which are routed to processor card 34 for processing in the same manner as signals 209. The low-gain channel handles signals 193 that have relative high signal strength and which do not need significant amplification. Thus, digital step attenuator 190, the low-gain channel and high-gain channel cooperate to provide the receiver with a wide dynamic range. In an exemplary embodiment, digital step attenuator 190, the low-gain channel and high-gain channel are configured to provide a receiver dynamic range of about 70 dB.

Referring again to FIG. 5, the receiver includes circuitry (not shown) that receives a primary voltage 250 from FEIC 30 via electrical connector 160 and converts primary voltage 250 into secondary voltages for powering the electrical components in the receiver. Signal conditioning circuitry 151 further includes thermistor circuit 280. Thermistor circuit 280 outputs analog telemetry signals over signal cable 282 which is connected to electrical connector 160. These analog telemetry signals, also indicated by reference number 159, are routed to FEIC 30 wherein these signals are digitized and then transferred to processor card 34 for processing. The analog telemetry signals determine the temperature of the circuit board containing signal conditioning circuitry 151.

Referring to FIG. 4, fiber laser card 32 includes connector 300 which is electrically connected to backplane 40 and receives a plurality of different DC voltages V1, V2, V3 and V4 for powering the electronic components. In an exemplary embodiment, the DC voltages include +/−12 VDC, +5.0 VDC and 3.3 VDC. In one embodiment, the DC voltages V1, V2, V3 and V4 are coupled to common mode circuitry (not shown) and voltage regulation circuitry (not shown). In such a configuration, thermistors may be used to monitor the voltage levels and the temperature of the common mode circuitry and voltage regulation circuitry. Fiber laser card 32 further includes electrical connector 302 which is also in electronic signal communication with backplane 40. Laser control circuit 304 is in electronic signal communication with electrical connector 302 and receives a command signal from processor card 34. In one embodiment, the command signal is a rising-edge pulse trigger signal. In response, laser control circuit 304 outputs a pulsed waveform 68 having a predetermined repetition rate defined by the command signal. The pulsed waveform 306 is coupled to seed laser 64. At the rising edge of pulse waveform 68, seed laser 64 outputs laser pulses 70 which are coupled to fiber laser optics network 305. In an exemplary embodiment, laser pulses 70 have a center wavelength of about 1553 nm, a peak pulse energy of about 2 uJ, a pulse width between about 2.0 ns and 3.0 ns. The repetition rate of laser pulses 70 is between about 5 kHz and 40 kHz. Charge pump 306 provides a DC voltage to seed laser 64 which determines the power level of laser pulses 70. Digital-to-analog converter (DAC) control circuit 308 receives digital control signals 310 from processing card 34 via backplane 40. DAC control circuit 308 routes serial clock and other data signals 310 to charge pump 306 and digital-to-analog converted (DAC) circuits 320, 322, 324 and 326. As described in the foregoing description, seed laser 64 includes laser diode 330, thermoelectric cooler (TEC) 332 and thermistor 334. TEC 332 maintains proper laser diode temperature. Thermistor 334 outputs telemetry signals that indicate the temperature of the laser diode 330. Telemetry signals 336 are coupled into multiplexer 338. Multiplexer 338 has a plurality of input channels. In an exemplary embodiment, multiplexer 338 is a sixteen channel multiplexer. Processor card 34 outputs selection signal 340 which selects one of the channels of multiplexer 338 that is to be coupled to the output of multiplexer 338. The signal in the selected channel is coupled to analog-to-digital converter (ADC) 344. In such a configuration, upon the appropriate selection signal 340, multiplexer 338 outputs telemetry signals 336 for input into ADC 344. ADC 344 converts the telemetry signals into digital signals 346 which are routed to processor card 34 via backplane 40. If the processed telemetry signals indicate that the laser diode temperature has increased and is outside of a predetermined range, then processor card 34 outputs data signals 310 that are inputted into DAC control circuit 308. In response, DAC control circuit 308 outputs a digital signal for input into DAC 320 that will increase the cooling provided by TEC 332. In response, DAC 320 outputs a corresponding analog signal that adjusts the cooling output of TEC 332. Seed laser 64 is also configured to output telemetry signals that indicate the pump current setting, the setting of TEC 332 and the relative laser telemetry intensity. All telemetry signals 336 are coupled to an input of multiplexer 338.

Pump laser 66 includes laser diode 350, TEC 352 and thermistor 354. Similar to thermistor 334 of seed laser 64, thermistor 354 outputs telemetry signals that indicate laser diode temperature. Pump laser 66 is also configured to output telemetry signals that indicate pump current settings and the current setting of TEC 352. All telemetry signals 360 outputted by pump laser 66 are coupled to multiplexer 338. DAC 322 is dedicated to regulation of TEC 352. DAC 324 sets the pump laser current for pump laser 66 upon receiving signals from DAC control circuit 308.

Similar to seed laser 64 and pump laser 66, pump laser 65 includes laser diode 370, TEC 372 and thermistor 374. Pump laser 65 is configured to output telemetry signals 376 that indicate laser diode temperature, pump laser current and the current setting of TEC 372. All telemetry signals 376 are coupled to multiplexer 338. Upon appropriate selection signal 340, telemetry signals 376 are routed to ADC 344 which converts the telemetry signals to digital signals that are processed by processing card 34. DAC 326 regulates the pump laser current of pump laser 65 in accordance with control signals received from DAC control circuit 308.

Fiber laser card 32 further includes laser status circuit 380. Laser status circuit 380 receives signal 382 from seed laser 64 that indicates whether seed laser 64 is in the "ON" state or the "OFF" state. In an exemplary embodiment, laser status circuit 380 includes a digital-to-analog converter (DAC) that converts signal 382 into a digital signal 384. Digital signal 384 is processed by processor card 34. In one embodiment, signal 382 also is routed to electrical connector 386 which functions as a GSE interface. Fiber laser card 32 further includes thermistors 387 and 388 which are also electrically connected to connector 386. Thermistors 387 and 388 provide telemetry signals that indicate the temperature of the fiber laser card 32. Telemetry signals 387 and 388 are coupled to electrical connector 386.

Referring to FIG. 6, there is shown a block diagram of FEIC 30. FEIC 30 functions as an interface between processor card 34 and the receiver in front end module 24. FEIC 30 also serves as an interface between processor card 34 and PCC (Payload Control Computer) 7.

FEIC 30 includes electrical connectors 400 and 402 that are electrically connected to backplane 40. DC voltages are applied to connector 400 that are used to power the components within FEIC 30. At least one of these DC voltages is filtered by power filter 406 to produce filtered DC voltage 250 which is coupled to connector 410 and routed to the connector 160 of front end module 24 (see FIG. 5). Electrical connector 402 receives the receiver gain control signal 192 from processor card 34. Receiver gain control signal 192 is a digital signal and is coupled to connector 410 and then routed to connector 160 of front end module 24. Connector 410 receives analog telemetry signals 159 outputted by the thermistors in the receiver circuit of front end module 24. These analog telemetry signals are coupled to analog-to-digital converter (ADC) 412. ADC 412 outputs digital signals 414 which are coupled to connector 402 and routed to processor card 34 for processing.

Processor card 34 generates digital signal 416 which represents a predetermined DC voltage that will be used to vary the attenuation of variable optical attenuator 116 (see FIG. 5). Digital signal 416 is coupled to digital-to-analog converter (DAC) 418. DAC 418 outputs DC voltage signal 161 which is routed to connector 166 of front end module 24. FEIC 30 further includes electrical connector 420 which receives a synchronization signal 422 from PCC 7. Synchronization signal 422 is coupled to electrical connector 402 so that it is routed to processor card 34. In response, processor card 34 outputs synchronization signal 424 which is coupled to electrical connector 420. Synchronization signal 424 is routed to LIDAR 10. Synchronization signals 422 and 424 synchronize the operation of LRF 20 and LIDAR 10 to minimize the interference with the reception and detection of laser pulse echoes by the receiver circuits in LRF 20 and LIDAR 10. It is to be understood that FEIC 30 may optionally include driver circuits such as RS-422 line drivers and receivers to condition signals 161, 192, 422 and 424. However, for purposes of simplifying the diagram of FIG. 6, such driver circuits are not shown.

FEIC card 30 further includes signal connectors 430 and 432 that are configured to handle RS-485 Standard Message Bus (SMB) signals from corresponding SMB buses that are in electronic data communication with PCC 7. RS-485 driver circuits 434 and 436 are in electronic signal communication with signal connectors 430 and 432, respectively. This configuration allows FEIC 30 to handle the transfer of SMB signals 440 and 442 between PCC 7 and processor card 34. In an exemplary embodiment, the SMB protocol uses CCSDS packets as the "data" portion of the SMB messages for transferring data between processor card 34 and PCC 7.

Figure 7:
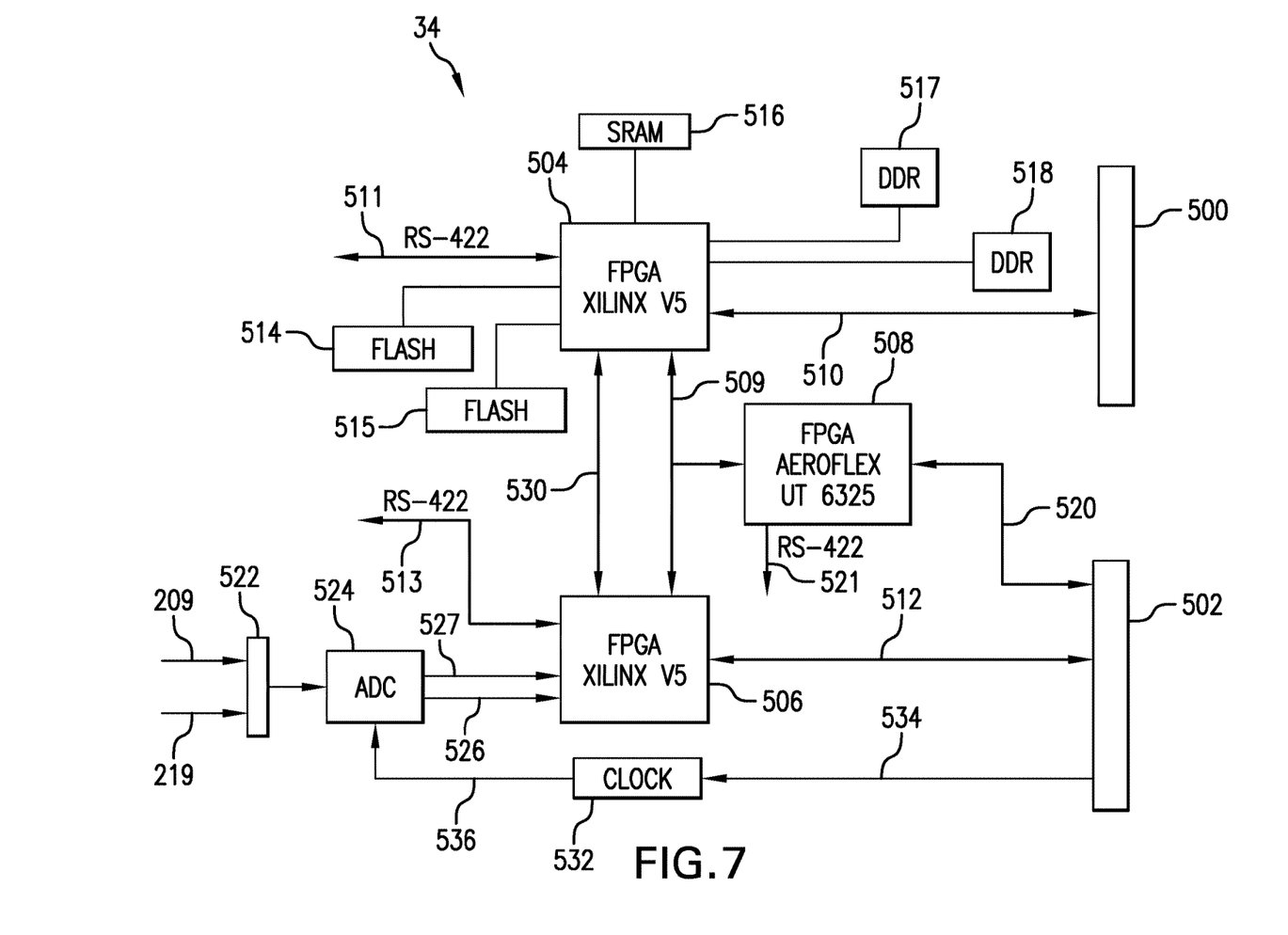
FIG. 7 is a block diagram of a processing card of the LRF system.

Referring to FIG. 7, there is shown a schematic diagram of an exemplary embodiment of processor card 34. Processor card 34 has several key features and functions, some are which are: (i) interfacing with PCC 7 via the SMB buses, (ii) receiving synchronization signals from FEIC 30 that are used to synchronize LRF 20 with LIDAR system 10, (iii) controlling fiber laser card 32 to generate laser pulses 110 at a predetermined time, power level and repetition rate, (iv) processing the conditioned pulse laser echo signals 209 and 219 outputted by receiver conditioning circuitry 151, (v) managing all command signals from PCC 7, and (vi) managing all telemetry signals from fiber laser card 32, FEIC 30 and power supply card 36.

For purposes of simplifying the block diagram of FIG. 7, power supply circuits, regulators or filters, which are well known in the art, are not shown. Processor card 34 includes electrical signal connectors 502 and 504 that are in electrical signal communication with backplane 40. Processor card 34 further includes programmable hardware elements 504 and 506. In an exemplary embodiment, each programmable hardware element 504 and 506 is a field programmable gate array (FPGA). FPGA 504 is in electrical signal communication with electrical connector 500 via data signal bus 510. FPGA 504 also outputs RS-422 digital signals 511 that are used by GSE for test and verification. Similarly, FPGA 508 is in electrical signal communication with electrical connector 502 via data signal bus 512. FPGA 506 also outputs RS-422 digital signals 513 that are used by GSE test and verification. FPGA 504 is in electronic data communication with various peripheral memory elements, such as flash memory devices 514 and 515, synchronous random access memory (SRAM) 516, double data rate synchronous dynamic random access memories (DDR SDRAM) 517 and 518. FPGA 504 and FPGA 506 receive SMB data packets from FEIC 30. As described in the foregoing description, FEIC 32 receives the SMB data packets from PCC 7 via PSU 14. These SMB data packets define command and control signals that define various parameters and also initiate the generation of laser pulses. For example, the command and control signals define the voltage level applied to the charge pump 306, a trigger-pulse waveform to be applied to seed laser 64, the pump level current applied to pump lasers 65 and 66, and the pulse width and repetition rate of the laser pulses generated by seed laser 64. As a result of the particular configuration of fiber laser card electronic circuitry 67 and fiber laser optic network 305, the power of laser pulses 110 generated by fiber laser card 32 may be varied over a dynamic range that is at least 10 dB. In response to these SMB data packets, FPGA 504 and FPGA 506 output signals to fiber laser card electronic circuitry 67 (see FIG. 4) so as to cause fiber laser card 32 to generate laser pulses 110 in accordance with the requisite parameters defined by the SMB data packets. In an exemplary embodiment, both FPGA 504 and FPGA 506 must issue matching signals to fiber laser card 32 in order to enable fiber laser card 32 to generate laser pulses 110. PCC 7 outputs SMB data packets that define the receiver gain and the attenuation of VOA 116 of front end module 24. FEIC 32 receives these signals from PSU 14 and then routes these SMB data packets to FPGA 504 and FPGA 506. In response, either FPGA 504 or FPGA 506 outputs signals 192 and 416 (see FIG. 6). Signals 192 and 416 are routed to FEIC 32. As described in the foregoing description, signal 416 is a digital signal and is converted to a DC voltage 161 by DAC 418. DC voltage 161 is routed to front end module 24 wherein it is used as a control voltage for VOA 116. As described in the foregoing description, signal 192 is the receiver gain control signal and controls the attenuation of digital step attenuator 190 in receiver signal conditioning circuitry 151. In an exemplary embodiment, each FPGA 504 and FPGA 506 is realized by the commercially available Xilinx™ V5 FPGA.

Processor card 34 further includes FPGA 508 which monitors the performance of FPGA 504 and FPGA 506 via data signal bus 509 and issues status reports in the form of SMB data packets over bus 520. FEIC 32 routes these SMB data packets to PCC 7 via PSU 14. FPGA 508 is programmed to take corrective actions regarding erroneous performance by FPGA 504 and 506. Specifically, FPGA 508 is programmed to issue reset signals to either FPGA 504 or FPGA 506 to correct erroneous or out-of-sync operation. FPGA 508 also monitors housekeeping telemetry for anomalies. FPRG 508 outputs RS-422 digital signals 521 that are used by GSE for test, debugging and verification. In an exemplary embodiment, FPGA 508 is realized by a commercially available Aeroflex™ UT6325 FPGA.

Processor card 34 further includes signal connector 522 which receives signals 209 and 219 that are outputted by receiver signal conditioning circuitry 151. Signals 209 and 219 are coupled to analog-to-digital converter (ADC) 524 which converts these signals into digital signals 526 and 527. FPGA 506 processes signals 526 and 527 in order to determine range of the target. FPGA 506 also routes digital signals 526 and 527 to FPGA 504 via data signal bus 530. FPGA 504 also processes digital signals 526 and 527 to determine the range of the target. Clock circuit 532 receives signal 534 which determines the sample rate for ADC 524.

Upon receiving signal 534, clock circuit 532 outputs clock signal 536 that corresponds to the desired sample rate. The sample rate represented by signal 534 is determined by PCC 7.

Figure 8:
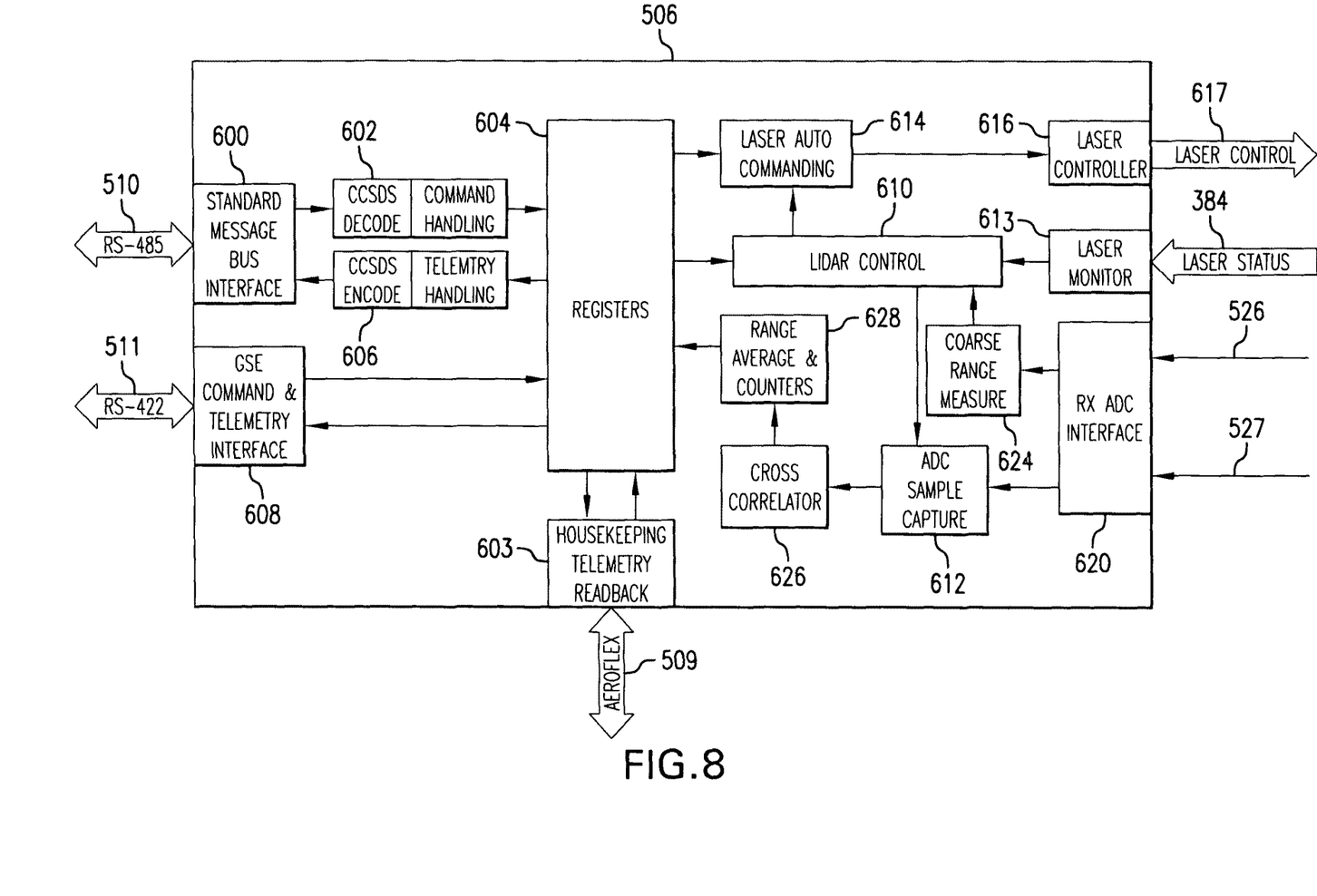
FIG. 8 is a block diagram of a field programmable gate array shown in FIG. 7.

Referring to FIG. 8, there is shown a block diagram of FPGA 506. Standard Message Bus (SMB) interface 600 communicates via bus 510 which is a RS-485 bus. Command messages that are sent to SMB interface 600 are formatted in a CCSDS Packet Format. When interface 600 receives the CCSDS packets, it transmits the CCSDS packets over a 9-bit (8-bit data, plus a command flag) interface to the CCSDS Command Decoding and Handling Block 602. Block 602 decodes the commands, computes the checksum to verify integrity of the command and then executes the command using register block 604. CCSDS Telemetry Encoding Block 606 transmits telemetry messages formatted in the CCSDS Packet Format. Block 606 reads telemetry information from register block 604, adds a CCSDS header and formats the message body in the standard telemetry message format. Block 606 then sends the packet to interface 600 over a 9-bit (8-bit data plus a command flag) interface. Register block 604 comprises a plurality of registers and provides access to the full address space for LRF 20. This feature allows block 604 to control all of the features of LRF 20 and also allows block 606 to access all laser range finder data and status information. Register block 604 has two interfaces that support command and telemetry. The first interface is block 606 which handles commands and telemetry during flight operations. The second interface is GSE Command and Telemetry interface 608 which is configured to handle command and telemetry from ground support equipment via a RS-422 link 511. Interface 608 is described in detail in the ensuing description.

In this embodiment, the functions of FPGA 504 are limited to relaying signals from backplane 40 to FPGA 506 and to perform monitoring and scrubbing functions.

Referring to FIG. 8, LiDAR control block 610 is in data signal communication with register block 604 and controls the operation of the components of fiber laser card 32 responsible for the generation of laser pulses 110. LiDAR control block 610 also controls ADC Sample Capture block 612. Block 612 issues time synchronized trigger commands to send the laser pulses and capture ADC samples 526 and 527 so as to ensure ADC samples 526 and 527 are stored at the correct time to capture the received pulsed laser light. Specifically, upon receiving a trigger command from LiDAR control block 610, ADC Sample Capture block 612 stores a fixed amount of ADC samples 526 and 527 received via from Rx ADC Interface block 620. When commanded from LiDAR control block 610, ADC Sample Capture block 612 performs waveform averaging of multiple sets of ADC samples 526 and 527. Once these samples have been stored in internal memory in block 612, these samples can be read out by Cross-Correlator block 626, which is described in detail in the ensuing description. LiDAR control block 610 also reads the status from Laser Monitor block 613 to verify that the fiber laser card 32 is functioning correctly and that the temperatures of the seed laser 64 and pump lasers 65 and 66 are within operating limits. Laser Monitor block 613 receives laser status signal 384 that is generated by laser status circuit 380 shown in FIG. 4. Laser Monitor block 613 verifies that commands have been correctly sent to fiber laser card 32. If the state of fiber laser card 32 is not as expected or any of the monitored temperatures are out of the normal operating range, register block 604 will issue commands that disable fiber laser card 32. Laser auto-commanding block 614 is in data signal communication with register block 604 and automates the sequence of operations required to enable or disable seed laser 64 (see FIG. 4). Laser auto-commanding block 614 also receives current-power settings for seed laser 64 and pump lasers 65 and 66 from register block 604. When the laser is enabled or disabled, the laser auto-commanding block 614 sends a series of DAC (digital-to-analog converter) and GPIO (general purpose input/output) commands to Laser Controller block 616. In response. Laser Controller block 616 outputs signal 617 for input into laser control circuit 304 in fiber laser card 32. In response, laser control circuit 304 outputs signal 68 which either enables or disables seed laser 64. When seed laser 64 is enabled, LiDAR control block 610 toggles a signal to Laser Controller block 616 to indicate when to fire the laser.

Rx ADC Interface block 620 captures samples 526 and 527 outputted by ADC 524 on processor card 34 (see FIG. 7) and outputs samples 526 and 527 in parallel fashion, eight (8) samples at a time. In an exemplary embodiment, blocks of Xilinx™ ISERDES are used for this purpose. This configuration allows the FPGA internal logic to run at 192.5 MHz which makes static timing closure easier. Rx ADC Interface block 620 also receives a divided down version of the ADC sampling clock signal 536 and generates other clock signals synchronous with sampling clock signal 536 by dividing down and phase shifting sampling clock signal 536. Block 620 is also responsible for setting all the appropriate control signals on ADC 524 so as to configure ADC 524 into the correct state for receiving signals 209 and 219 from receiver signal conditioning circuitry 151. Coarse Range Measure block 624 examines the real time ADC samples coming from Rx ADC Interface block 620 to make an approximate time of flight measurement for the current laser pulse. This is accomplished by counting the number of clock cycles between the laser fire command and the maximum received ADC sample. This measurement is averaged over a number of laser fires so that spurious noise will not affect the measurement. This information is fed back to LiDAR control block 610 so that it can quickly determine when to start the ADC sample capture in relation to its "laser fire" command.

Cross Correlator block 626 reads raw ADC samples from ADC Sample Capture block 612 when they become available. Block 626 includes a bank of correlator blocks. Each correlator block takes a turn reading out the fixed set of samples that were captured, interpolating by sixteen, filtering with a low-pass filter and finding the maximum valued sample with its corresponding index. Cross Correlator block 626 reports a computed time of flight and intensity into an outgoing FIFO (First-In-First-Out) which is read by downstream logic. If the maximum value falls below a computed threshold, the range measurement is flagged as a no return (i.e. no laser pulse was detected). If an over-range is detected in the captured samples, then an over-range flag is set in the outgoing data. Range Average & Counters block 628 computes an average time of flight for transmitted laser pulses 140 (see FIG. 5). This average is computed at a 1 Hz rate using the time of flight measurements from Cross Correlator block 626. Range Average & Counters block 628 also maintains counters that record the number of captures that had over-ranges as well as the number of captures that resulted in a no-return. This information in conjunction with the count of the number of times the laser was fired helps to determine if the laser power needs to be adjusted for this particular range.

House Telemetry Readback block 630 polls FPGA 508 to read back general housekeeping data of processor card 34.

Such housekeeping data includes temperature and voltage readings that were derived from analog telemetry signals. This data is reported back to register block 604 so that it can be included in outgoing telemetry. GSE Command & Telemetry Interface 608 uses a RS-422 interface to perform reads and writes to register block 604. Interface 608 provides a debugging interface to diagnose problems with the SMB Message Bus Interface 600.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

Finally, any numerical parameters set forth in the specification and attached claims are approximations (for example, by using the term "about") that may vary depending upon the desired properties sought to be obtained by the present invention. At the very least, and not as an attempt to limit the application of the doctrine of equivalents to the scope of the claims, each numerical parameter should at least be construed in light of the number of significant digits and by applying ordinary rounding.

What is claimed is:

1. A laser range finder system to determine the range of a target, comprising:
   a laser pulse generating device for generating laser pulses;
   a laser amplifier for amplifying the laser pulses to produce amplified laser pulses, the laser amplifier including laser components that can vary the power of the amplified laser pulses;
   a transmitter for transmitting the amplified laser pulses toward a target;
   a receiver for receiving laser pulse echoes reflected by a target, the receiver including a laser light detector and dual signal conditioning channels to condition and amplify signals derived from detected laser light and output conditioned signals, wherein one of the channels is a high-gain channel for amplifying laser pulse echoes having relatively lower signal power and the other channel is a low-gain channel for amplifying laser pulse echoes having relatively higher signal power;
   a digitizer to sample the conditioned signals outputted by the dual signal conditioning channels so as to produce samples of laser pulses and convert the samples to digital signals; and
   a processing element to process the digital signals to determine an echo signature, a time of flight to the target and a range to the target; and
   wherein said laser components vary the power of the amplified laser pulses over a dynamic range of the receiver thereby facilitating range measurements to be obtained from multiple kilometers down to a meter or less.

2. A laser range finder system to determine the range of a target, comprising:
   a laser pulse generating device for generating laser pulses;
   a laser amplifier for amplifying the laser pulses to produce amplified laser pulses, the laser amplifier including laser components that can vary the power of the amplified laser pulses;
   a transmitter for transmitting the amplified laser pulses toward a target;
   a receiver for receiving laser pulse echoes reflected by a target, the receiver including a laser light detector and dual signal conditioning channels to condition and amplify signals derived from detected laser light and output conditioned signals, wherein one of the channels is a high-gain channel for amplifying laser pulse echoes having relatively lower signal power and the other channel is a low-gain channel for amplifying laser pulse echoes having relatively higher signal power;
   a digitizer to sample the conditioned signals outputted by the dual signal conditioning channels so as to produce samples of laser pulses and convert the samples to digital signals; and
   a processing element to process the digital signals to determine an echo signature, a time of flight to the target and a range to the target;
   wherein the laser pulse generating device includes a seed laser having an input for receiving a pulsating waveform; and
   wherein the laser pulse generating device further includes circuitry to vary the power of the laser pulse generated by the seed laser; wherein said circuitry to vary the power of the laser pulse vary the power of the laser pulses over a dynamic range of the receiver thereby facilitating range measurements to be obtained from multiple kilometers down to a meter or less.

3. The laser range finder system according to claim 2, wherein the laser components of the laser amplifier include a first pump laser and a second pump laser.

4. The laser range finder system according to claim 3 further including circuitry to vary electrical current applied to the first pump laser and the second pump laser.

5. The laser range finder system according to claim 3 wherein the first pump laser and the second pump laser each include a photodiode.

6. The laser range finder system according to claim wherein the seed laser includes a photodiode.

7. The laser range finder system according to claim 2, wherein the laser light detector converts the detected laser pulses into a voltage waveform.

8. The laser range finder system according to claim 7 further including a filter to filter the voltage waveform so as to produce a filtered voltage waveform.

9. The laser range finder system according to claim 8 wherein the filter is a low-pass filter.

10. The laser range finder system according to claim 6 wherein the receiver includes a variable attenuation component before the dual signal conditioning channels to minimize signal overload, the variable attenuation component having an input for receiving voltage waveform and another input for receiving a control signal that determines the level of attenuation to be applied to the voltage waveform.

11. The laser range finder system according to claim 10 wherein the variable attenuation component is a digital step attenuator and the control signal is a digital signal that defines a level of attenuation that is to be exhibited by the digital step attenuator.

12. The laser range finder system according to claim 11 wherein the processing element includes circuitry to generate the control signal.

13. The laser range finder system according to claim 11 wherein the low-gain channel of the receiver includes an attenuator that attenuates the voltage waveform outputted from the digital step attenuator.

* * * * *